United States Patent [19]

Levy

[11] Patent Number: 4,544,721
[45] Date of Patent: Oct. 1, 1985

[54] CHLOROTRIFLOUROETHYLENE POLYMER ORIENTED FILMS

[75] Inventor: Stanley B. Levy, Wilmington, Del.

[73] Assignee: E. I. Du Pont de Nemours and Company, Wilmington, Del.

[21] Appl. No.: 539,399

[22] Filed: Oct. 6, 1983

[51] Int. Cl.$^4$ .................. B29D 7/24; B29G 7/00; C08F 14/24

[52] U.S. Cl. .................. 526/249; 264/288.4; 526/247

[58] Field of Search .................. 526/249, 247

[56] References Cited

U.S. PATENT DOCUMENTS

| | | | |
|---|---|---|---|
| 2,643,988 | 6/1953 | Walter | 526/249 |
| 2,792,377 | 5/1957 | Miller | 260/33.8 |
| 2,956,048 | 10/1960 | Bolstad et al. | 526/249 |
| 3,018,276 | 1/1962 | Bandes | 526/249 |
| 3,501,446 | 3/1970 | Ragazzini et al. | 526/249 |
| 4,011,874 | 3/1977 | Segawa et al. | 128/362 |
| 4,053,445 | 10/1977 | Schulze | 526/249 |

OTHER PUBLICATIONS

Choy, Cheng & Hsu, J. Polymer Sci., Polymer Physics, 19, 991–1002, (1981).

*Primary Examiner*—Harry Wong, Jr.

[57] ABSTRACT

A film of semi-crystalline poly(chlorotrifluoroethylene) or a semi-crystalline copolymer of chlorotrifluoroethylene which contain up to 5% comonomer units which film exhibits upon heat shrinking, no expansion in the direction perpendicular to stretching.

5 Claims, No Drawings

CHLOROTRIFLOUROETHYLENE POLYMER ORIENTED FILMS

BACKGROUND OF THE INVENTION

This invention relates to chlorotrifuoroethylene polymer oriented films and a process for their preparation.

Oriented films of chlorotrifluoroethylene polymers are well known in the art. These polymers are melt extruded through an orifice to form a film and are then quenched and drawn. See for example U.S. Pat. No. 4,011,874. However, such films tend to expand in the direction perpendicular to the direction of stretching and, hence, are not practical for heat shrinking around substrates where tension in such perpendicular direction is required to hold the film taut.

SUMMARY OF THE INVENTION

This invention provides an oriented film which is heat-shrinkable, i.e., the film can be shrunk, on heating, around a solid substrate. The films are thus useful as outdoor protective coverings over a variety of objects, e.g., street signs, or over electrical wire and the like.

The oriented film is a film of semi-crystalline poly(chlorotrifluoroethylene) or of a chlorotrifluoroethylene copolymer which contains up to 5% by weight of units of an ethylenically unsaturated copolymerizable organic monomer, which film, on heating, shrinks when shrinkage is measured in one direction and does not expand in a direction perpendicular to that of first direction. Further, the film's tensile modulus measured in said perpendicular direction remains comparable to the modulus measured in the first direction, the creep resistance measured in said perpendicular direction shows significant improvement, moisture barrier properties increase, surface electrical resistivity increases, and piezo-electric response is enhanced.

In a preferred embodiment, the films have a shrinkage of 0 to 2 percent in the direction perpendicular to the direction of stretching (hereinafter called "transverse" direction), and shrinkage of at least 12 percent in the direction of stretching (hereinafter called "longitudinal" direction), when heated for 2 minutes at 150° C. and, preferably, a transverse tensile modulus greater than 65 percent of the longitudinal tensile modulus at room temperature and at least a two-fold improvement in transverse creep resistance over that of the unstretched film.

Also provided is a process for the production of these films, as well as a process by which these films are heat set. Also provided are thermally dimensionally stable films.

DETAILED DESCRIPTION

The poly(chlorotrifluoroethylene) and the chlorotrifluoroethylene/comonomer polymers used in this invention are well known, as is the formation of films from the polymers. The comonomer is an ethylenically unsaturated copolymerizable organic monomer. Representative comonomers include alpha-olefins, such as ethylene; fluorinated alpha-olefins, such as hexafluoropropylene, hexafluoroisobutylene, vinylidene fluoride, tetrafluoroethylene; fluorinated ethers such as perfluoroalkyl vinyl ethers and for instance, perfluoropropyl vinyl ether; perfluoroalkyl ethylenes such as perfluorobutyl ethylenes; and the like.

Generally speaking, the polymer is extruded in melt form from an orifice and quenched to well below its melting point. The extrusion orifice can be such that the film produced is in flat sheet or tubular form. The film thickness will generally be between 0.5 and 100 mils before stretching and about 0.05 and 20 mils after stretching. If tubular film is to be stretched in accordance with the subject invention, the tube may first be collapsed and laid flat, or be slit and opened into flat sheet form.

The films that are subjected to the stretching procedures described herein are substantially unstretched films. In other words the films are "as-cast" films which have low moduli and strength. Normally, these films have moduli of about 900 MPa in the transverse and longitudinal direction, and exhibit a dimensional stability of about ±2.0 percent in each direction when heated at 150° C. (a negative dimensional change represents expansion).

To orient the films, the films are transported into contact with and partially around a pair of rolls. The rolls are aligned parallel with each other and, to effectuate uniaxial stretching of film the peripheral drive speed of the first roll is slower than that of the second roll, the difference in periphral drive speeds being such that the film is stretched to at least 2.5 times the length of the unstretched film. The break point for many films covered herein is about 5 times the length of unstretched films. Of course, multiple rolls may also be used to effectuate stretching.

To prevent slippage of film on the rolls, the film is contacted with the rolls as, for example, by the partial wrapping of the film around the rolls. Alternatively, conventional nip rolls may be used to force film onto either or both rolls.

The film must be heated to a temperature at least about 40° C. above the second order transition temperature of the polymer in order to accomplish the desired stretching. Preferably, this stretching temperature is between 85° and 130° C. The film need be at stretch temperature when it enters the stretch zone. The heating can be accomplished by, e.g., heating the roll, or by housing the stretching apparatus in an oven.

To obtain the shrinkage characteristics in the film as a result of stretching, the film must be held under tension until cooled to below the second order transition temperature of the polymer. This may be accomplished by conventional cooling means applied between the second roll and the wind-up means or, alternatively, the second roll may act as a cooling means. As is common with stretched film, the very edges of the film are of non-uniform gauge relative to the remainder of the film. These edges, or "beads", are generally trimmed prior to packaging the wound film.

The film to be stretched must be a substantially amorphous film in order to obtain good oriented film. By "substantially amorphous" is meant that X-ray diffraction patterns of the film show diffusely scattered X-rays, in contrast to the more ordered sharper patterns exhibited by semi-crystalline materials. After stretching, the film is semi-crystalline.

In addition, another critical aspect of the subject invention is the ratio of the width of the film to be stretched to the length of the stretch zone, the stretch zone being defined as the length of film which is allowed to stretch at any given instant, i.e., the length of the film between the rolls as measured from the tangent of the film that contacts the roll. The result of too small a ratio, as seen below, is a film which, when re-heated, shrinks in the direction of stretching but expands in the direction perpendicular to stretching. For purposes of the subject invention, the ratio of film width to stretch zone length need be greater than about 3, preferably greater than about 10. Of course, if a partial wrap-around stretching apparatus is to be used, the distance between the two rolls need only be greater than the thickness of the film in order for the film to pass between the rolls. If the stretch zone is greater, the film becomes fibrillar.

Another critical aspect of the subject invention is the degree of uniaxial stretching. Film stretched less than about 2.5 times its original length tends to expand upon heating in the direction perpendicular to stretching. When an attempt is made to stretch the film greater than about 5 times its unstretched length, the polymer fibrillates and utimately breaks.

In the films of this invention, the tensile modulus in the direction perpendicular to the stretching, i.e., the transverse direction (TD), increases with stretch ratio and, upon completion of the uniaxial stretching as described above, remains greater than 65 percent of the tensile modulus in the direction of stretching, i.e, the longitudinal direction (LD). This result is surprising as it has generally been found that uniaxial stretching does not substantially alter the transverse tensile modulus.

Further, the films of this invention exhibit transverse shrinkage of 0 to 2 percent, and longitudinal shrinkage of at least 12 percent, when heated for 2 minutes at 150° C.

The test for determining the amount of shrinkage in a non-heat-set film is as follows:

Six 10 cm × 2.5 cm samples are cut from the material, three along the direction of stretch and three perpendicular to it. They are placed in an oven at 150° C. for a period of two minutes with no restraint. After removal and air cooling, the samples are measured in their long dimension. The percent shrinkage is calculated for two directions, and the results averaged for each direction (a negative shrinkage represents expansion). below the crystalline melting point of the polymer.

The uniaxially stretched film produced in accordance with the procedure above can be heat set in any conventional manner to enhance dimensional stability. For example, the film can be run over a pair of rolls, the first heated to a heat set temperature about 10° C. below the crystalline melt temperature of the polymer, the second, acting as a cooling roll, having a temperature below the second order transition temperature of the polymer. The peripheral drive speeds of these rolls may be approximately equal to allow what is known in the art as stress relaxation or, alternatively, the second roll may be run at a speed slightly slower than the first to allow what is known as strain relaxation. The time of heat setting is not critical so long as the film becomes dimensionally stable.

The test for determining dimensional stability of a heat-set film is as follows:

Three 10 cm × 10 cm samples are cut from the material, one from the middle and one from near each edge. They are placed in an oven at the designated temperature for a period of 30 minutes with no restraint. After removal and air cooling, the samples are measured in both the LD and TD; five measurements at equally spaced intervals are made in each direction, at 1, 3, 5, 7 and 9 cm. For each sample a percentage dimensional change is calculated and the results averaged in each direction. When so tested, the heat set films are dimensionally stable and exhibit a transverse dimensional change of between 0 and 2% and a longitudinal dimensional change of 0 to 4%, when heated for thirty minutes at 150° C. Further, the transverse and longitudinal moduli are increased over non-heat-set film, and the transverse modulus comes to within 75% of the longitudinal modulus. Surprisingly, the edge thickening, or "bead" effect evident after the uniaxial stretching detailed above is reduced, and in some cases eliminated, by the heat setting of the films. This bead elimination results in improved transverse gauge uniformity not generally evidenced with stretched, heat set film of the past.

The lack of transverse expansion, and in most cases positive transverse shrinkage, of the films of the subject invention allows those films to be fit, e.g., around window casings, around cooking surfaces, over domed frames etc., and heat shrunk, thereby causing the film to draw taut. The high transverse tensile modulus allows the film to withstand conversion induced stresses, distortion and warpage. Finally, the two-dimensional creep resistance of the films of the subject invention reduces the need for structural support for these films.

In general, the films of this invention are useful as carriers, electrical insulation, chemical barriers, thermal barriers, physical barriers, structural members, or as manufacturing aids in the following applications: wire bundling; insulation for wires, membrane switches, motor slots, flat cables, flexible printed circuits, capacitors, strain gauges, under-carpet wiring, transformers, ultrahigh voltage cable, cable splicing tapes, etc.; electrets; tamper resistant seals for outdoor use such as for utility meters and other tamper resistant seals; mica replacement; microwave lens/window (ovens/radomes); tubing (spiral wound, laminated, sealed); gaskets; diaphragms; heat exchangers; chemical reactors; linings; ducting; expansion joints; bags; sight-glass coverings; pond liners; shrinkable covers; column packing, e.g. for distillation; de-mist devices; pillows (evaporation control); flange safety covers; spill-control bladders; protective clothing; rupture disks; antistick/corrosion resistant surfacing or covering; pumps; windows and glazing; lighting lenses; solar collectors (glazing/reflector/absorber); coated film base; skylights; architectural panels; reflective film (metallized and laminated); green houses; covers for photovoltaic cells; sewage treatment enclosures; protective laminations (i.e., documents, signs, decals, labels); release films; metallizing carrier belt; cooking/heating equipment (UV, IR, electromagnetic); deicing surfaces; roll covering; solar sails; drafting film; safety shields for light and heat sources (bulbs, flame, etc.); chemical service; pressure sensitive tape base; belting; closures (cap liners); magnetic recording film bases; punch tape bases; interior surfacing (protective and decorative); yarn (slit film); strapping; packaging (chemical, medical, sterilizable, etc.); roll leaf carrier; enclosures (gloved containment boxes, oxygen tents, etc.); office machines (ribbon shield, etc.); appliance printed control panel; roofing; cross-ply sheeting; air barrier curtain; oven liners.

The subject invention will be more fully understood with reference to the examples.

EXAMPLE I

An amorphous copolymer film of chlorotrifluoroethylene and vinylidene fluoride (present in an amount of about 3.8 wt. percent), which was 18 inches (46 cm) wide and 5 mils thick (0.13 mm) was stretched on a 2-roll stretch apparatus at 100° C. (measured in the 1st roll) at a film input speed of 10 ft/min (5 cm/sec where the stretch zone was 20 mils (to result in a ratio of width of film to length of stretch zone of 31.8).

The film was stretched at the percents shown in Table I. Percent shrink in the Longitudinal Direction (LD) and the Transverse Direction (TD) and the modulus in the LD and TD were measured.

TABLE I

| % Stretch | % Shrink LD at 150° C. | % Shrink TD at 150° C. | Modulus MPa LD | TD |
|---|---|---|---|---|
| 0 | 2.0 | 0.0 | 965 | 896 |
| 50 | 13 | −4 | 1296 | 1103 |
| 100 | 12 | −1.3 | 1503 | 1310 |
| 150 | 11.6 | 0 | 1655 | 1427 |
| 200 | 13.1 | 0 | 1772 | 1400 |
| 250 | 13 | 0.5 | 1820 | 1427 |
| 300 | 13.4 | 0.7 | 2013 | 1448 |
| 350 | 13.3 | 0.8 | 2013 | 1461 |
| 400 | 14 | 0.8 | 2131 | 1440 |
| 450 | 12.3 | 1.0 | 2206 | 1475 |

Attempts to stretch crystalline polychlorotrifluoroethylene polymers resulted in films that contained holes, tears or which were uneven in thickness.

COMPARATIVE EXAMPLE

An amorphous copolymer film similar to that used in Example I was stretched in a manner similar to that explained in Example I, except the ratio of film width to stretch zone length was about 0.9.

The film was stretched at the percents shown in Table II. Percent shrink in the Longitudinal Direction (LD) and the Transverse Direction (TD) and the moduli in the LD and TD were measured. The Transverse Direction (TD) dimensional change was always an expansion. The LD and TD moduli did not increase as fast as in Example I, and the film became so fibrillar at ratios above 250% that the film could not be cut for Instron samples.

TABLE II

| % Stretch | % Shrink LD (150° C.) | TD | Modulus (MPa) LD | TD |
|---|---|---|---|---|
| 0 | +2.0 | 0.0 | 965 | 896 |
| 50 | 19.0 | −9.7 | 1103 | 1034 |
| 100 | 18.7 | −9.7 | 1262 | 1083 |
| 150 | 17.3 | −7.3 | 1324 | 1089 |
| 200 | 12.7 | −6.8 | 1613 | 1172 |
| 250 | 11.5 | −4.3 | 1875 | — |
| 300 | 11.5 | −4.0 | — | — |

Longer stretching, beginning about 250%, tended to fibrillate the film. It is seen that the TD shrink values are negative which means the film expanded in the TD.

EXAMPLE II

Heat Setting

An amorphous copolymer film similar to that used in Example I was stretched in a manner similar to that explained in Example I, except that after stretching, an additional roll was used for in-line heat setting at 170° C.

The film was stretched at the percents shown in Table III. LD and TD dimensional stabilities and LD and TD moduli were measured. The dimensional stability values were below 3% in the LD and 1% in the TD. In addition, the LD and TD moduli increased faster than in Example I, particularly the TD, which tended to balance the moduli.

TABLE III

| % Stretch | Dim. Stab.[1] LD | (150° C.) | TD | Modulus (MPa) LD | TD |
|---|---|---|---|---|---|
| 0 | −2.0 | | 0.0 | 965 | 896 |
| 50 | 0.0 | | 1.0 | 1607 | 1165 |
| 100 | 0.8 | | 0.0 | 1820 | 1627 |
| 150 | 1.3 | | 0.5 | 2041 | 1710 |
| 200 | 1.2 | | 0.5 | 2193 | 1724 |
| 250 | 0.2 | | 0.5 | 2027 | 1744 |
| 300 | 1.0 | | 0.5 | 2255 | 1827 |
| 350 | 1.9 | | 0.5 | 2082 | 1813 |
| 400 | 2.6 | | 0.4 | 2337 | 1813 |

[1]Dimensional stability

I claim:

1. A film of semi-crystalline poly(chlorotrifluoroethylene) or a semi-crystalline copolymer of chlorotrifluoroethylene which contains up to 5% by weight of units of an ethylenically unsaturated copolymerizable organic monomer selected from the class consisting of alpha-olefins, fluorinated alpha-olefins and fluorinated ethers, which film has been oriented by stretching a substantially amorphous form of the film at least 2.5 times, at a temperature at least 40° C. above the second order transition temperature at a ratio of film width to length of stretch zone of greater than 3, so that the film, after cooling under tension for two minutes at about 150° C. exhibits a shrinkage of 0 to 2 percent in a first direction in the plane of the film, and a shrinkage of at least 12 percent in a second direction in the same plane as the first and which is perpendicular to the first direction.

2. The film of claim 1 wherein said first direction is the direction perpendicular to the direction of stretching and said second direction is the direction of stretching semi-crystalline poly(chlorotrifluoroethylene) or a semi-crystalline copolymer of chlorotrifluoroethylene which contains up to 5% by weight of units of an ethylenically unsaturated copolymerizable organic monomer, which film exhibits transverse shrinkage of 0 to 2 percent, and longitudinal shrinkage of at least 12 percent.

3. The film of claim 1 or 2 wherein the ethylenically unsaturated copolymerizable organic monomer is vinylidene fluoride.

4. A dimensionally stable film comprising a film obtained by heating a film of claim 1 while under tension; said dimensionally stable film exhibiting a dimensional change in a first direction in the plane of the film of between 0 and 4%, and a dimensional change of between 0 2% in a second direction in the same plane and which is perpendicular to the first direction, when heated at 150° C. for 30 minutes and the tensile modulus in said first direction is at least 1.5 times that of an as-cast film and the modulus in the second direction is at least 75% of that of the first direction.

5. A dimensionally stable film of claim 4 wherein the first direction is the direction of stretching and the second direction is a direction perpendicular to the direction of stretching.

* * * * *